United States Patent [19]

Orain

[11] Patent Number: 4,576,503
[45] Date of Patent: Mar. 18, 1986

[54] TORQUE TRANSMISSION ASSEMBLY

[75] Inventor: Michel A. Orain, Conflans-Sainte-Honorine, France

[73] Assignee: Uni-Cardan Aktiengesellschaft, Siegburg, Fed. Rep. of Germany

[21] Appl. No.: 559,205

[22] Filed: Dec. 8, 1983

[30] Foreign Application Priority Data

Dec. 14, 1982 [DE] Fed. Rep. of Germany ....... 3246233

[51] Int. Cl.$^4$ ..................... F16D 1/06; F16C 19/08
[52] U.S. Cl. ..................... 403/259; 403/261; 403/370; 403/359; 384/538; 384/267
[58] Field of Search ............ 403/259, 261, 370, 368, 403/374, 359; 384/538, 267

[56] References Cited

U.S. PATENT DOCUMENTS

| | | | |
|---|---|---|---|
| 1,771,769 | 7/1930 | Brunner | 403/370 |
| 1,922,929 | 8/1933 | Chamberlain | 403/259 |
| 2,128,068 | 8/1938 | Anderson | 403/259 |
| 2,317,070 | 4/1943 | Tourneau | 403/259 X |
| 3,374,015 | 3/1968 | Gies | 403/370 X |
| 3,899,257 | 8/1975 | Gladieux | 403/259 |
| 4,433,877 | 2/1984 | Colanzi | 403/259 X |

FOREIGN PATENT DOCUMENTS 2142453  8/1973  Fed. Rep. of Germany ...... 403/370

Primary Examiner—Cornelius J. Husar
Assistant Examiner—Todd G. Williams
Attorney, Agent, or Firm—Toren, McGeady, Stanger, Goldberg & Kiel

[57] ABSTRACT

In a torque transmitting assembly including a driven member and a driving member, one having teeth thereon extending parallel to the rotational axis and the other having teeth thereon extending obliquely to the rotational axis, an annular member is interposed which also has teeth which are parallel to the rotational axis and oblique to the rotational axis for engaging with the corresponding teeth of the driving and driven members in order to place them in torque transmitting engagement with each other. The annular member is formed from a deformable metallic material and the obliquely extending teeth extend relative to the parallel teeth at an angle of between 15° and 45°.

4 Claims, 5 Drawing Figures

TORQUE TRANSMISSION ASSEMBLY

The present invention relates generally to torque transmitting devices and more particularly to a device for transmitting torque between a driving part and a driven part.

In devices of the type to which the present invention relates, the driving and driven parts are arranged so as to be at least partially coaxial relative to each other. Gear teeth are provided in engaging relationship between the parts and a pressure nut and bolt hold the assembly together.

Generally, the torque transmitting devices to which the present invention relates operate to transmit torque from a rotary constant velocity universal joint of a driven motor vehicle wheel to the wheel hub upon which the wheel is affixed. Usually, one of the two parts is provided with circumferentially spaced teeth extending parallel to the axis of rotation of the parts and the other part is provided with an extending area in the form of a truncated cone, the cylindrical area of which comprises teeth which extend at an angle relative to the axis of the two parts whose imagined extensions intersect the axis at a point, with provision being made, between the two sets of teeth, for a ring whose cross-section is approximately triangular and which has a bore and a outer surface forming a triangular area which has been provided with teeth which correspond to the teeth of the other two parts and against which the nut and bolt respectively may be pressed.

A device of this kind is described in U.S. Pat. No. 4,433,877 wherein, for the purpose of transmitting torque from a driving part to a driven part, there is recognized the importance of utilizing a ring whose geometric configuration is approximately triangular and which, both at its outside and inside, has been provided with teeth. The ring to be fixed in the axial direction by a nut engages into corresponding teeth which, in turn, are arranged at both the driving and driven parts of the torque transmitting device.

Although the concept of using a toothed ring has been proposed, it has been found that such a ring does not provide an optimum design because it neither permits a centering of the components which are to be connected together nor does it ensure tensioning in the axial direction.

The present invention is therefore directed toward providing a design for a toothed ring of the type described which, while having served only for torque transmitting purposes, is arranged in such a manner that at the same time it may also be used for centering the components as well as for producing necessary axial tension. The invention operates to optimize in this respect the function of the device and to facilitate assembly and production.

SUMMARY OF THE INVENTION

Briefly, the present invention may be described as a torque transmitting assembly comprising a driven member and a driving member each arranged to rotate about an axis of rotation, parallel teeth on one of said driving and driven members extending generally parallel to its axis of rotation, oblique teeth on the other of said driving and driven members extending obliquely relative to its axis of rotation, and an annular member interposed in torque transmitting engagement between said driving and driven members, said annular member having a generally triangular cross-sectional configuration with parallel teeth thereon formed on one side thereof for engagement with said parallel teeth on said one of said driving and driven members and with oblique teeth thereon on another side thereof for engagement with said oblique teeth of said other of said driving and driven members, said annular member being formed from deformable metallic material with said parallel teeth and said oblique teeth extending relative to each other at an angle which is between 15° and 45°.

Thus, in accordance with the present invention, the objectives thereof are achieved in that the deformable annular member or ring is composed of a metallic ring which is elastically and/or plastically deformable and which has a cylindrical face carrying outer teeth forming an angle α of approximately 15° to 45°, but preferably 30°, relative to inner teeth arranged so as to be parallel to the axis of rotation.

In accordance with one embodiment of the invention, the outer and inner teeth are designed as pointed teeth.

In accordance with a further feature of the invention, the inner teeth are offset relative to the outer teeth in such a manner that the point of a tooth of one set of the teeth and the tooth base between two teeth of the other set of teeth lie in a common plane.

A further important feature of the invention involves the face that between the inner teeth and the teeth of the corresponding other part, in an untensioned condition, there exists a play of approximately 0.05 to 0.2 mm.

The invention as proposed thus far is rounded off and completed in that the annular member or ring including its teeth is produced by precision forming, especially cold forming.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
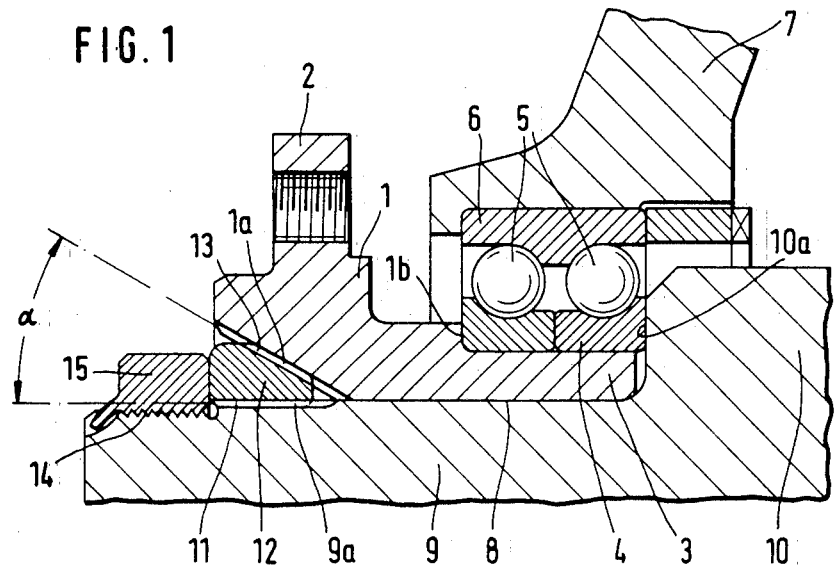
FIG. 1 is a sectional view of a wheel bearing assembly comprising a torque transmitting arrangement in accordance with the invention.

Referring now to the drawings, and more particularly to FIGS. 1-4 wherein there is depicted a preferred embodiment of the invention, there is shown in FIG. 1 a wheel bearing assembly comprising a rotary constant velocity universal joint for a motor vehicle which consists essentially of a wheel hub 1, the end of which has been provided with a flange 2 which serves to mount a wheel (not shown). The wheel hub 1 has a cylindrical projection 3 which accommodates therein an inner bearing ring 4 of a roller bearing. The inner bearing ring 4 is formed with grooves wherein rolling members 5 are engaged, and an outer bearing ring 6 is also configured to be engaged with the rolling members 5.

A carrier 7 for the wheel bearing assembly operates to ensure mounting of the assembly at a motor vehicle location (not illustrated).

The cylindrical projection 3 defines an inner bore 8 wherein there is contained a journal 9 of an outer joint member 10 of a rotary constant velocity universal joint, the balance of which is not illustrated. The journal 9 is provided, at an end thereof away from the universal joint, with longitudinal teeth 9a. These teeth are arranged to be engaged by corresponding teeth 11 formed on a ring 12, which will be described in greater detail hereinafter.

The wheel hub 1 is also provided with an obliquely extending set of teeth 1a and the ring 12 is likewise formed with a complementary set of teeth 13 which operate to engage in the teeth 1a of the wheel hub 1.

Thus, it will be seen that by engagement of the teeth 11 with the teeth 9a in the journal 9 and by engagement of the outer teeth 13 of the ring 12 with the teeth 1a of the wheel hub 1, the wheel hub 1 and the journal 9 are rotatably coupled for torque transmitting engagement therebetween.

The members 9 and 1 are at least partially coaxial and rotate about a common rotational axis. It will be seen that the teeth 9a and 11 are arranged to extend generally parallel to the rotational axis and that the teeth 1a and 13 are arranged to extend obliquely relative thereto.

Figure 2:
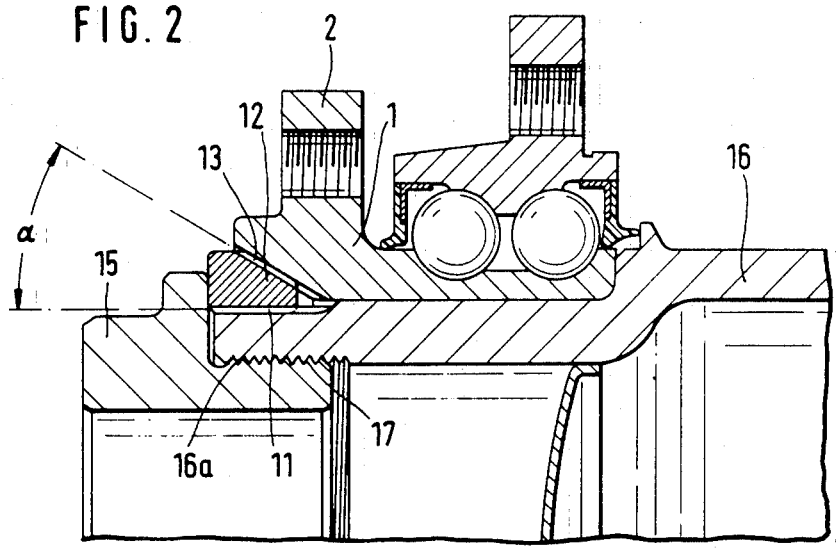
FIG. 2 is a sectional view showing another embodiment of the invention similar to FIG. 1 including the torque transmitting assembly of the invention.

As indicated in FIGS. 1 and 2, the wedge-shaped or triangular cross-section of the ring 12 is formed with a wedge angle $\alpha$ which is approximately 15° to 45°, and which in a preferred embodiment of the invention is 30°.

In an untensioned condition, there is a clearance of approximately 0.05–0.2 mm between the teeth 9a of the journal 9 and the teeth 11 of the ring 12. The outer teeth 13 of the ring 12 of course engage, in turn, into the correspondingly designed counter teeth 1a of the wheel hub 1.

The assembly is provided with a nut 15 which is screwed onto the journal-like projection 9 of the outer joint member 10 by means of threads 14 in order to exert an axial pressure onto the ring 12 while it is being tightened. By selection of suitable material, the ring 12 may therefore be elastically deformed. Deformation may be such that it may even extend into the plastic range. This not only ensures a non-rotating connection between the journal 9 and the wheel hub 1, but it will also ensure above all a completely clearance-free connection. When tightening the nut 15, there is an additional advantage in that there is provided a wedge-shaped configuration for the ring 12. The advantage arises in that the wheel hub 1 including its cylindrical projection 3 are moved into the direction of the rotary constant velocity joint to such an extend that, by means of a collar 1b, the inner bearing ring 4 of the roller bearing may be pressed against a shoulder 10a of the outer joint member and, in the process, simultaneously tensioned relative thereto without causing any jamming of the bearing ring 4. Wedging of the ring 12 against the wheel hub 1 on the one hand, and the journal 9 on the other hand, is enhanced by designing the teeth 9a/11 and 1a/13 as pointed teeth. Accordingly, the inner teeth 11 of the ring 12 are offset relative to the outer teeth 13 in such a manner that the point or apex of each of the teeth of one set of teeth and the tooth base between adjacent teeth on the other set of teeth will lie in a common plane.

A modification of the embodiment of the invention is shown in FIG. 2 wherein a drive shaft 16 is connected with the bearing assembly instead of the rotary constant velocity universal joint. In the embodiment shown in FIG. 2, the axial pressure acting on the ring 12 is also caused or generated by a nut 15. However, in contrast to the embodiment depicted in FIG. 1, in the assembly shown in FIG. 2, the nut 15 is formed with an external thread 17 which cooperates with an internal thread 16a of the drive shaft 16.

Figure 3:
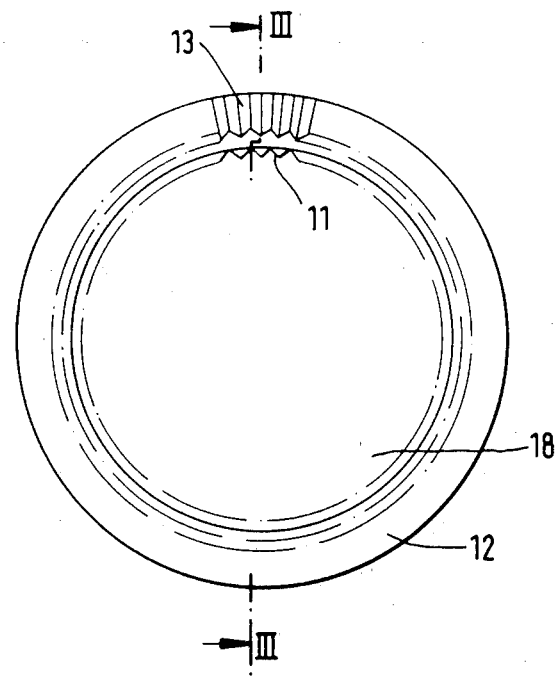
FIG. 3 is a front view of a toothed ring which may be provided in the assembly of the invention.
Figure 4:
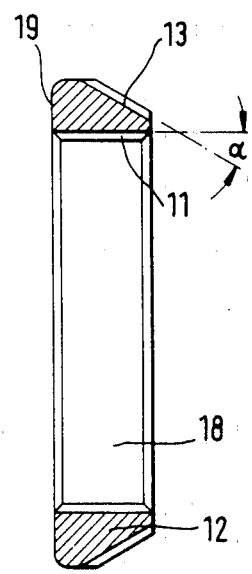
FIG. 4 is a sectional view of the ring shown in FIG. 3 taken along the line III—III.

FIGS. 3 and 4 illustrate in greater detail the ring or annular member 12 shown as a separate individual component. The ring 12 is formed with a bore 18 which is provided with internal teeth 11 and an inclined outer face which is provided with the external teeth 13. The wedge shape or triangular configuration of the cross-section of the ring is depicted and the oblique outer face of the ring is formed with the teeth 13. The inner teeth 11 are arranged so as to be parallel to the axis of rotation of the member upon which the ring 12 is to be mounted. An angle $\alpha$ is formed between the oblique teeth 13 and the parallel teeth 11 and this angle, as best seen in FIG. 4, is approximately 15° to 45°, but preferably 30°. The ring 12 is formed with an end face 19 which serves as a stop or pressure face for the nut 15 in order to receive the axial pressure produced from tightening of the nut 15.

Figure 5:
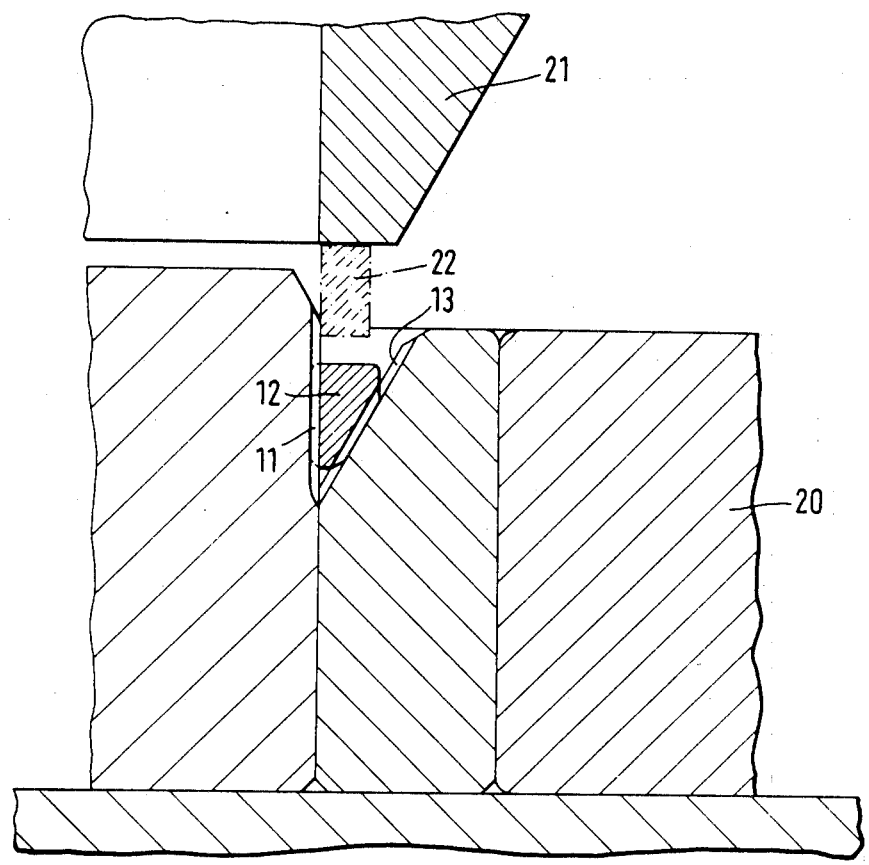
FIG. 5 is a sectional view showing apparatus for producing the toothed ring of the invention by cold forming.

In FIG. 5 there is shown apparatus for forming the ring 12. The apparatus comprises a pressing tool 20 which serves for producing, in a manner that does not involve cutting or chip formation, the ring 12 together with its teeth 11 and 13. The ring 12 is produced by precision forming and more particularly by cold forming. The ring is formed from a blank 22 which is shown in its unmachined condition and a pressing die 21 is also provided.

Thus, it will be seen that the present invention provides a device for tranferring torque from a driving part to a driven part, with the transfer of torque occurring in a clearance-free manner. The device of the present invention may be used for constant velocity universal joints particularly in driving assemblies for motor vehicle wheels.

The objectives of the invention are achieved by means of a metallic, elastically and/or plastically deformable ring having a cylindrical face carrying outer teeth and inner teeth arranged so as to be parallel relative to the axis of rotation of the assembly wherein an angle $\alpha$ of approximately 15° to 45° is formed between the inner and outer teeth, with the angle being preferably 30°.

While specific embodiments of the invention have been shown and described in detail to illustrate the application of the inventive principles, it will be understood that the invention may be embodied otherwise without departing from such principles.

What is claimed is:

1. In a device for transferring torque from a driving part to a driven part, especially from a rotary constant velocity joint of a driven motor vehicle wheel onto a wheel hub provided for the purpose of fixing said wheel, said two parts defining an axis of rotation and being at least partially coaxial relative to each other with one of said parts being provided with circumferentially spaced teeth extending parallel to said axis of the two parts and with the other of said parts being provided with a widening area in the shape of a truncated cone shell equipped with teeth arranged on said shell surface which extend at an angle relative to said axis of the two parts whose imagined extensions intersect the axis at a point, said device further including a ring having an approximately triangular cross-sectional configuration being provided between said two sets of teeth, said ring having a bore arranged coaxially with said axis and an outer surface forming a triangular area which has been provided with teeth which correspond to the teeth of the other two parts and tightening screw means threadedly engaged so as to be pressed against said ring, the improvement comprising:

that said outer surface of said ring is equipped with outer teeth which engage with said teeth on said shell surface of said truncated cone shell;

that said bore of said ring is provided with inner teeth which engage with said teeth extending parallel to said axis;

that said outer surface of said ring encloses with respect to said bore an acute angle of approximately 30°;

that between said teeth extending parallel to said axis and said inner teeth in said bore of said ring engaging therewith there is provided a radial clearance of between 0.05 and 0.2 mm when said tightening screw means is not tightened so as to be pressed against said ring; and said ring is elastically and plastically deformed when said tightening screw means is in the tightened state.

2. A device according to claim 1 wherein said inner and outer teeth are designed as pointed teeth.

3. A device according to claim 2 wherein said inner teeth are offset relative to said outer teeth in such a manner that the apex of each of said teeth of one set of teeth and the tooth base lying between adjacent teeth of the other set of teeth are arranged to lie in a common plane.

4. A device according to claim 1 wherein said ring including the teeth formed thereon are produced by a cold forming process.

* * * * *